United States Patent
Ho

(10) Patent No.: US 9,469,187 B1
(45) Date of Patent: Oct. 18, 2016

(54) VEHICLE RADIATOR V TYPE LAYOUT

(71) Applicant: Thunder Power Hong Kong Ltd., Central (HK)

(72) Inventor: Ming-Hui Ho, Tainan (TW)

(73) Assignee: THUNDER POWER HONG KONG LTD., Central (HK)

( * ) Notice: Subject to any disclaimer, the term of this patent is extended or adjusted under 35 U.S.C. 154(b) by 0 days.

(21) Appl. No.: 14/977,621

(22) Filed: Dec. 21, 2015

(51) Int. Cl.
*B60K 11/04* (2006.01)
*B60K 11/08* (2006.01)
*B60H 1/00* (2006.01)
*B60H 1/32* (2006.01)

(52) U.S. Cl.
CPC ........... *B60K 11/08* (2013.01); *B60H 1/00328* (2013.01); *B60H 1/3227* (2013.01); *B60H 1/3229* (2013.01)

(58) Field of Classification Search
CPC ....... B60K 11/02; B60K 11/04; B60K 11/06; B60K 11/08; B60K 11/085; B62D 25/084; B62D 25/085; B60H 1/00328; B60H 1/3227; B60H 1/3229
See application file for complete search history.

(56) References Cited

U.S. PATENT DOCUMENTS

| | | | | |
|---|---|---|---|---|
| 4,832,116 A * | 5/1989 | Easton | ................... | B60K 11/04 165/119 |
| 5,341,652 A * | 8/1994 | Tajiri | ................... | B60H 1/0005 165/42 |
| 5,476,138 A * | 12/1995 | Iwasaki | ............. | B60H 1/00321 165/41 |
| 6,390,217 B1 * | 5/2002 | O'Brien | ................. | B60K 11/04 160/DIG. 1 |
| 8,091,516 B2 * | 1/2012 | Preiss | .................... | B60K 11/04 123/41.05 |
| 8,794,363 B2 * | 8/2014 | Wolf | .................... | B60K 11/085 180/68.1 |
| 9,250,020 B2 * | 2/2016 | Vikstrom | ................ | F28F 27/02 |
| 2005/0023057 A1 * | 2/2005 | Maeda | ................. | B62D 25/084 180/68.1 |
| 2006/0211364 A1 * | 9/2006 | Brotz | ..................... | B60K 11/08 454/261 |
| 2007/0068716 A1 * | 3/2007 | Kunikata | ............... | B60K 11/04 180/68.4 |
| 2008/0257286 A1 * | 10/2008 | Harich | ................. | B60K 11/085 123/41.12 |
| 2011/0083920 A1 * | 4/2011 | Mori | ...................... | B60H 1/025 180/68.4 |
| 2013/0081888 A1 * | 4/2013 | Charnesky | ............ | B60K 11/04 180/68.3 |
| 2014/0138077 A1 * | 5/2014 | Ajisaka | ................. | B60K 11/04 165/287 |

* cited by examiner

*Primary Examiner* — John Walters
*Assistant Examiner* — Brian Swenson
(74) *Attorney, Agent, or Firm* — Kilpatrick Townsend & Stockton LLP

(57) ABSTRACT

Heat exchanger configurations for a vehicle. The heat exchangers can take the form of a condenser and a radiator. Instead of arranging the heat exchangers sequentially within a unitary air duct, this disclosure describes a multiple channel ducting system, where the heat exchangers are arranged in a v shape that allows a first portion of air entering the air to travel up towards a trunk of the vehicle and a second portion of the air to travel downward and out through a bottom exterior surface of the vehicle.

15 Claims, 5 Drawing Sheets

VEHICLE RADIATOR V TYPE LAYOUT

FIELD

The disclosed embodiments relate generally to ways of arranging heat dissipating components within a vehicle. In particular, a v type layout is described in which incoming ambient air is split into two channels that flow to the condenser and radiator of the vehicle.

BACKGROUND

Vehicle cooling systems often utilize ambient air to dissipate heat from radiator and condenser components of the vehicle cooling systems. Most vehicle cooling systems arrange the radiator and condenser in parallel so that ambient air passes first through one component and then through the other component. Unfortunately, this type of configuration can reduce the efficiency at which heat is removed from the second component as the ambient air arrives at the first component at a substantially higher temperature than it does at the second component. Furthermore, stacking the components in parallel also tends to require a large block of space in the vehicle immediately adjacent to an opening capable of drawing ambient air into the vehicle. For many designs the only feasible place to locate this area is at the front of the vehicle, which can preclude the placement of other large components in that location. Consequently, alternate designs that accommodate different component placements and have increased heat rejection capabilities are desirable.

SUMMARY

This paper describes various embodiments that relate to cooling components of a vehicle.

In a first embodiment, a vehicle cooling system is disclosed that includes the following: an air intake; ducting arranged to split air entering the air intake into multiple channels; a first heat exchanger arranged within a first channel of the channels; a second heat exchanger arranged within a second channel of the channels; a first exhaust vent oriented to exhaust air from the first channel through an upper exterior surface of a vehicle; and a second exhaust vent oriented to exhaust air from the second channel through a lower exterior surface of the vehicle.

In many embodiments, the first heat exchanger is oriented substantially orthogonal with respect to the second heat exchanger.

In many embodiments, the first heat exchanger is a radiator configured to dissipate heat from a motor of the vehicle.

In many embodiments, the second heat exchanger can take the form of a condenser configured to dissipate heat from a cabin cooling system.

In many embodiments, the vehicle cooling system also includes air movers (e.g. fans) configured to draw air into one or more of the channels.

In many embodiments, the first heat exchanger is a condenser configured to dissipate heat from a cabin cooling system.

In many embodiments, the second heat exchanger is a radiator configured to dissipate heat from a motor of the vehicle.

In many embodiments, the second exhaust vent includes a number of flow guides configured to bias air exiting the second exhaust vent towards a rear end of the vehicle.

In other embodiment a vehicle is disclosed that includes the following: an engine; an air conditioning system; an air intake disposed along a forward facing surface of the vehicle; ducting configured to distribute air received through the air intake into a plurality of channels; a condenser in thermally conductive contact with the air conditioning system and positioned within a first channel of the plurality of channels; and a radiator in thermally conductive contact with the engine and positioned within a second channel of the plurality of channels.

In many embodiments, the air passing through the second channel is exhausted so that it exits the vehicle and passes over the hood of the vehicle.

In many embodiments, the first channel is separate and distinct from the second channel.

In many embodiments, the vehicle also includes temperature sensors configured to measure a temperature of the condenser and the radiator. The ducting can be configured to vary an amount of air entering each of the channels based on the temperatures measured by the temperature sensors.

In many embodiments, a central portion of the ducting articulates in multiple directions to vary the amount of air entering each of the channels.

In many embodiments, the first channel includes an exhaust vent that is arranged so that the air exiting the first channel passes over the hood of the vehicle.

In yet another embodiment, an electric vehicle is disclosed and includes the following: an electric motor; an evaporator; a condenser configured to receive heat from the evaporator; and a radiator configured to receive heat from the electric motor, the radiator cooperating with the condenser to form a v-shaped structure.

In many embodiments, the electric vehicle also includes an air intake; and ducting configured to distribute air received by the air intake to the condenser and the radiator.

In many embodiments, the condenser and the radiator each include cooling fins configured to increase the dissipation of heat from the condenser and the radiator.

In many embodiments, the ducting distributes air entering the electric vehicle through the air intake evenly between the condenser and the radiator.

In many embodiments, the ducting includes an articulated portion configured to move between multiple positions to alter the distribution of air received by the condenser and the radiator.

In many embodiments, the electric vehicle also includes flow guides positioned at an exhaust vent that direct the flow of air exiting the radiator along a lower surface of the electric vehicle.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
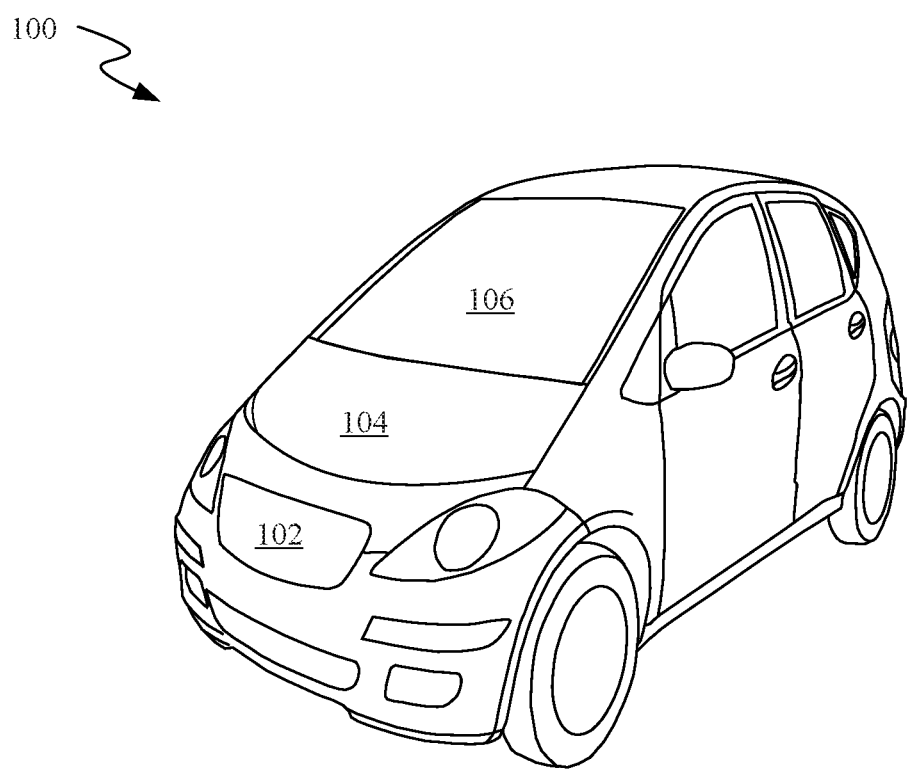
FIG. 1 shows a perspective view of a vehicle suitable for use with the described embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The convective transfer of heat can be accomplished by passing a cool gas over a large heat emitting surface. As the difference between the temperature of the gas and the temperature of the heat emitting surface decreases the overall heat transfer efficiency is commensurably reduced. Reducing the speed of the gas flowing over the heat emitting surface can also cause substantial reductions in heat transfer efficiency as portions of the gas tend to remain in convective contact with the heat emitting surface for longer periods of time, thereby increasing the temperature of the gas and reducing the heat transfer efficiency. Consequently, stacking heat emitting surfaces in parallel, so that one stream of gas passes across both sequentially has a number of disadvantages. In particular, the second heat emitting surface has to reject heat into the stream of gas that has already received gas from the first heat emitting surface. For this reason, heat transfer out of the second heat emitting surface is commensurably less efficient. In embodiments, where the heat emitting surfaces take the form of fin stacks, the ambient air is also slowed as it flows past the fin stacks making the heat transfer characteristics even worse.

One solution to this problem, in the context of a vehicle cooling system, is to configure an ambient air intake with multiple branches that each carry a portion of the air entering a vehicle to various heat emitting components within the vehicle. In this way, the heat emitting components are able to receive cooling air at the exterior temperature. Additionally, the branches allow the heat emitting to be separated and placed strategically in areas of the vehicle having space to accommodate those heat emitting components. In some embodiments, a first heat emitting component can be arranged near an upper portion of the vehicle and a second heat emitting component can be arranged near a lower portion of the vehicle. By arranging the components in this manner, heat transferred to the ambient air can be exhausted through vents leading out of upper and lower portions of a vehicle. In some embodiments, heated exhaust air from one of the heat emitting components can be exhausted towards a windshield of the vehicle to act combat fogging of the windshield of the vehicle.

These and other embodiments are discussed below with reference to FIGS. 1-XX; however, those skilled in the art will readily appreciate that the detailed description given herein with respect to these figures is for explanatory purposes only and should not be construed as limiting.

FIG. 1 shows an exemplary vehicle suitable for use with the described embodiments. In particular, vehicle 100 includes air intake 102 positioned along a forward facing surface of vehicle 100. Also depicted is a hood 104 of vehicle 100 which can also be utilized as a means for directing air leaving vehicle 100. For example, a portion of the air entering air intake 102 can be exhausted along an exterior surface of hood 104. While a speed at which vehicle 100 has a direct effect upon a volume of air entering vehicle 100, in some embodiments, vehicle 100 can include an internal fan that draws ambient air into air intake 102 to help facilitate cooling of internal heat emitting devices while vehicle 100 is not in motion. Vehicle 100 can also include a windshield 106, which can also benefit from heated air leaving a cooling system of vehicle 100.

Figure 2A:
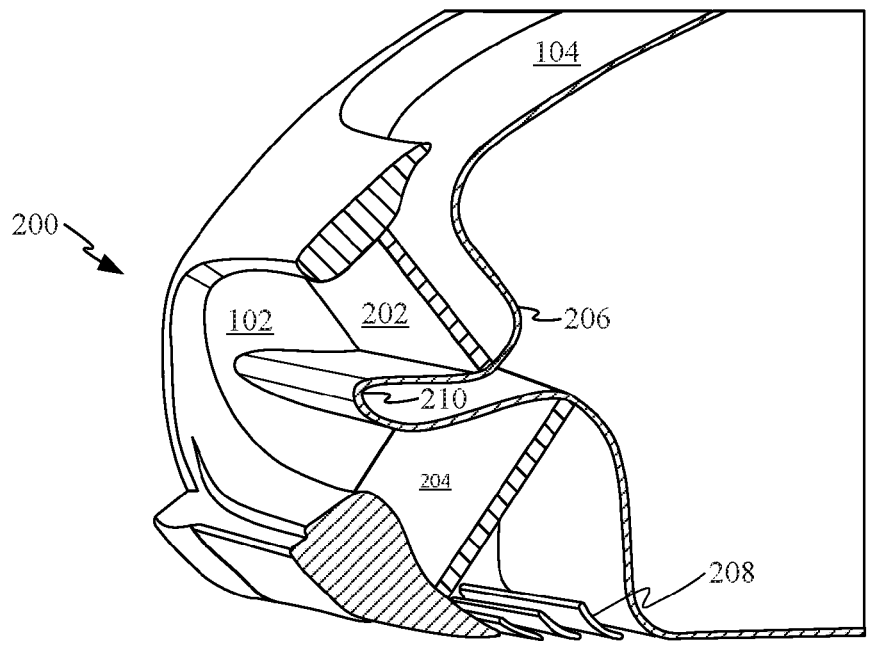
FIG. 2A shows a cut-away perspective view of a cooling system of the vehicle depicted in FIG. 1.

FIG. 2A shows a cut-away perspective view of a portion of vehicle 100. In particular, FIG. 2A shows air intake 102 leading into two separate ducting paths that lead to heat exchangers associated with a cooling system of vehicle 100. For exemplary purposes the heat exchangers can be referred to as condenser 202 and radiator 204; however these component locations could be swapped in some designs. As depicted, a first ducting path leads to condenser 202 and a second ducting path leads to radiator 204. By situating condenser 202 and radiator 204 in a roughly v-shaped configuration, the air redirected by ducting 206 that flows through cooling condenser 202 or radiator 204 can already be oriented towards an air exhaust duct. Flow guides 208 can be positioned at the end of the second ducting path to help bias exhausted air towards the rear of vehicle 100. This can improve aerodynamics of vehicle 100 while vehicle 100 is in motion. Similarly the exit of the first ducting path can also include flow guides configured to direct the flow of the exhaust air in a desired direction. In some embodiments, when the windshield is in need of heating to reduce condensation, flow guides could help orient heated air towards windshield 106 of vehicle 100. This can be particularly effective given that condenser 202 is associated with a cooling system of vehicle 100 and direction of heated air can be coordinated with output of air into the cabin of vehicle 100.

Figure 2B:
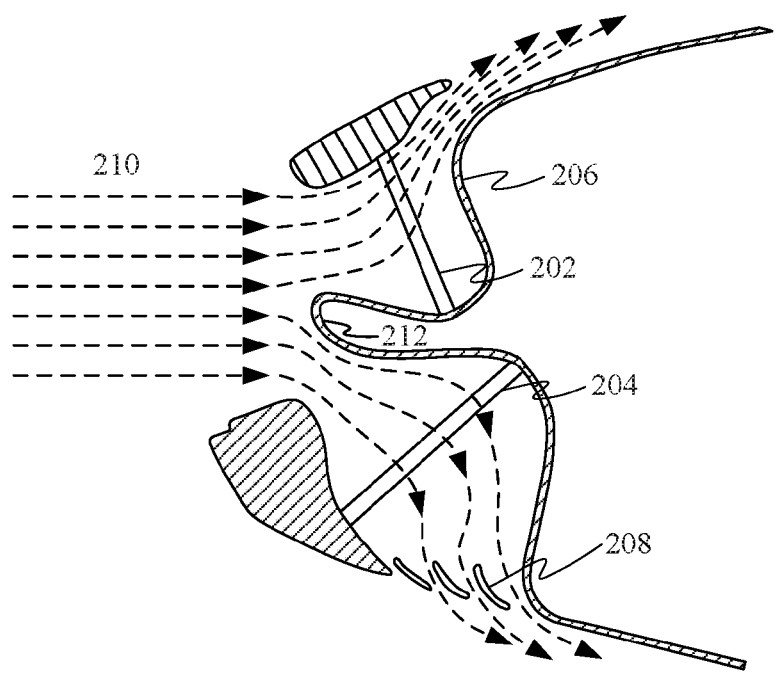
FIG. 2B shows a cross-sectional view of the cooling system depicted in FIG. 2A.

FIG. 2B shows how once ambient air 210 enters through air intake 102 it is directed to one of condenser 202 or radiator 204 by ducting 206. Ducting 206 has a smooth curvature at a leading edge 212 of ducting 206 that prevents the creation of turbulent flow within vehicle 100. Ducting 206 also helps to minimize an amount of turning ambient air is forced to do after entering into ducting 206. As depicted, ducting can be integrally formed with a portion of hood 104 and/or a bottom portion of vehicle 100. In this way ducting 206 can be firmly locked in place during operation of vehicle 100. The relatively straight pathways formed by a combination of ducting 206 and interior surfaces of a body of vehicle 100, which the ambient inlet air follows through, helps to reduce pressure build up within the cooling system. The low pressure nature of the cooling system helps maintain high air speed velocities through the cooling system 200 by reducing back pressure generated within the system on account of the reduced redirection of air. This can also reduce an amount of resistance vehicle 100 encounters while driving forward, thereby reducing an amount of energy used to propel the vehicle. It should be noted that while particular angles are shown in FIGS. 2A and 2B that any angle is possible and that generally a vector normal to an inlet surface of condenser 202 has a downward facing component and an inlet surface of radiator 204 has an upward facing component. In some embodiments, leading edge 212 can be articulated, which allows leading edge 212 to adjust an amount of air flowing to the heat exchangers. For example, by articulating leading edge 212 of ducting 206 down towards the wheels of vehicle 100 an amount of air directed towards radiator 204 can be substantially reduced while an amount of air reaching condenser 202 is commensurably increased. In some situations, leading edge 212 can be reoriented to completely close the opening leading into one of the ducts.

Figure 2C:
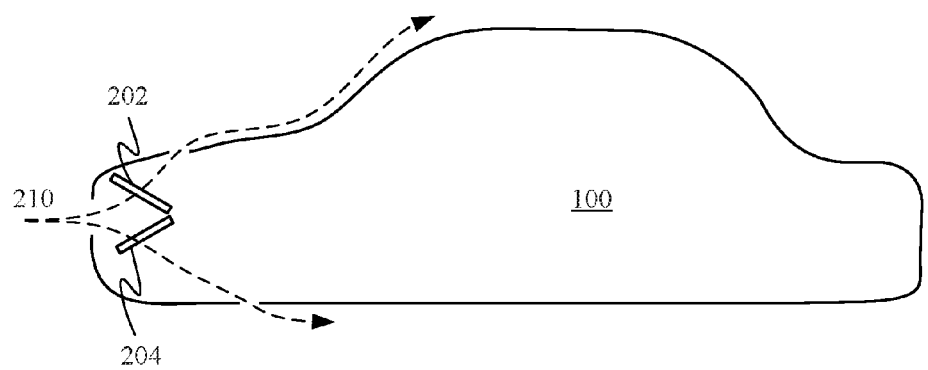
FIG. 2C shows a cross-sectional view of the vehicle depicted in FIG. 1 and how exhausted air passes around the vehicle.

FIG. 2C shows a high level flow pattern of air as it passes around vehicle 100. A portion of ambient air 210 entering vehicle 100 and passing through condenser 202 exits along an exterior surface of vehicle 100 and flows smoothly over the top of vehicle 100. A portion of ambient air 210 entering vehicle 100 and passing through radiator 204 exits along a bottom surface of vehicle 100. In this way a flow of air entering into vehicle 100 splits in much the same way air would if it did not enter vehicle 100. In this way, the entry of ambient air 210 into vehicle 100 can have a rather negligible effect on the aerodynamics of vehicle 100. In some embodiments, the flow of ambient air 210 is actually less disturbed than it would be otherwise if forced above or below a front facing surface of vehicle 100 as it is allowed to turn at more gradual angles. In some embodiments, this configuration can make up for any pressure build up caused by the passage of ambient air through fins or passages of condenser 202 and radiator 204.

Figure 3:
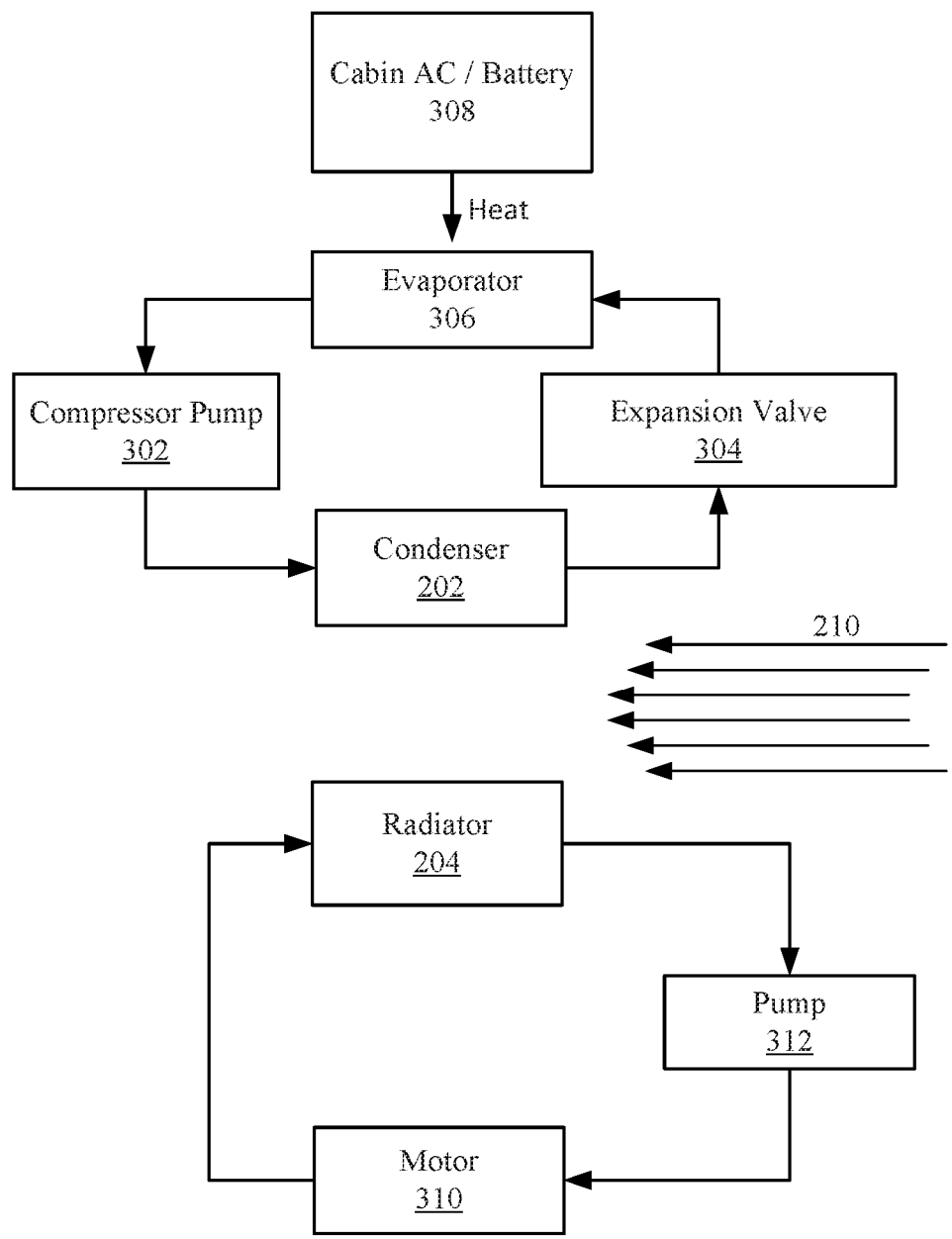
FIG. 3 shows exemplary cooling components associated with the condenser and the radiator.

FIG. 3 shows how condenser 202 and radiator 204 respectively dissipate heat from vehicle 100. Condenser 202 receives pressurized gas from compressor pump 302. The pressurized gas from compressor pump 302 is then cooled by ambient air passing along a surface of condenser 202. The surface of condenser 202 can have a complex exterior surface geometries configured to maximize an amount of the surface area exposed to ambient air 210. For example, condenser 202 can have an array of cooling fins designed to efficiently exchange heat with ambient air 210. The cooling system is designed to remove enough heat to transition the compressed gas into a liquid. The liquid then passes through expansion valve 304, which both regulates an amount of liquid reaching evaporator 306 and reduces a pressure of the liquid reaching evaporator 306. As the liquid passes through evaporator 306, it can be used to cool air entering the cabin of vehicle 100. The air can be cooled by forcing it across a surface of evaporator 306. In some embodiments evaporator 306 can include a number of fins that function to increase the amount of surface area available for absorbing heat from the air blowing across it. Alternatively or additionally, the cooled liquid can be used to cool a battery providing power for vehicle 100. It should be noted that in some embodiments, the cabin of vehicle 100 can also be heated by this system by for example reversing the flow of working fluid to create a heat pump configured to deliver heat to the cooling system.

FIG. 3 also shows radiator 204 and how radiator 204 can be utilized to dissipate heat from cooling fluids routed through motor 310. In some embodiments, motor 310 can be an electric motor. Pump 312 keeps the cooling fluids circulating between radiator 204 and motor 310. In this way, heat generated by motor 310 can be transferred to and dissipated by radiator 204, which convectively transfers heat to ambient air 210. It should be noted that in some embodiments, radiator 204 can be configured in the same way as condenser 202 causing phase changes in the heat transferring fluid flowing between motor 310 and radiator 204.

Figure 4:
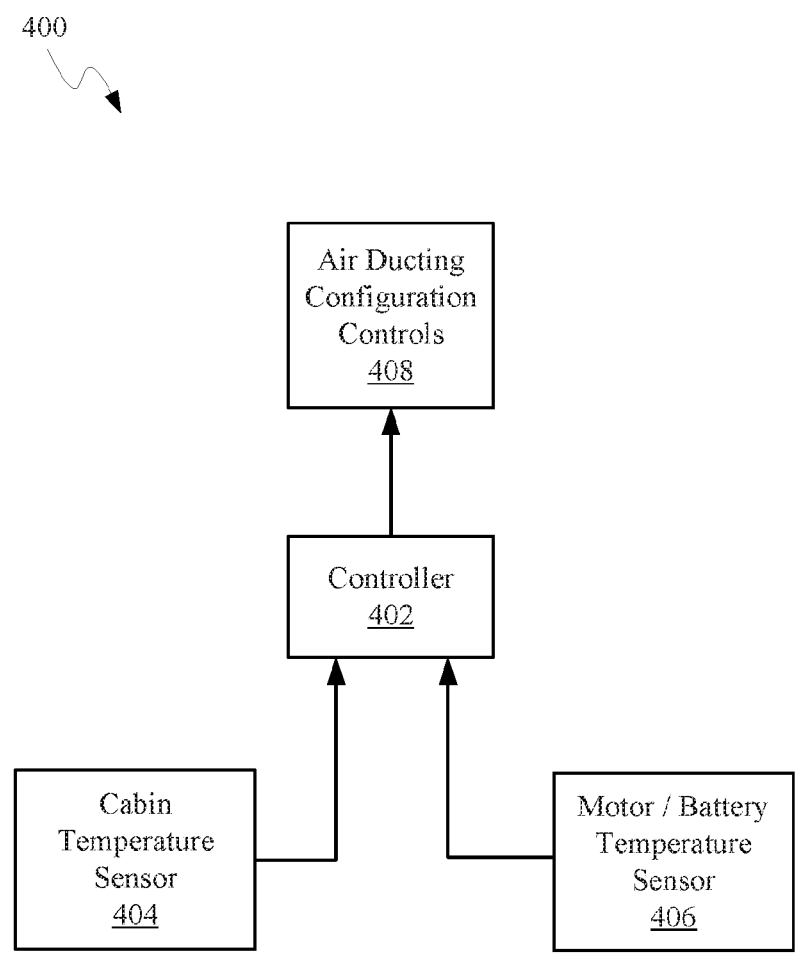
FIG. 4 shows a block diagram describing interaction between a controller or processor and other components of the vehicle cooling system.

FIG. 4 shows a block diagram representing controller 402 and how based upon signals received from various temperature sensors along the lines of a cabin air temperature sensor 404 and/or a motor temperature sensor 406, controller 402 can be configured to instruct air ducting controls 408 to change a configuration of the air ducting so that an amount of air delivered to each of condenser 202 and radiator 204 is changed. This is possible in account of each heat exchanger having its own conduit for receiving cooling air. In some embodiments, priority is given to whichever one of the heat exchangers is the hottest. In other embodiments, priority is given to any heat exchanger exceeding a predetermined maximum temperature for that particular heat exchanger. It should also be appreciated that in some embodiments more than one heat exchanger can be positioned within the vehicle and that the air ducting configuration controls could be capable of routing air to three or more heat exchangers.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A vehicle cooling system, comprising:
    an air intake;
    ducting configured to split air entering the air intake into a plurality of channels;
    a first heat exchanger arranged within a first channel of the plurality of channels;
    a second heat exchanger arranged within a second channel of the plurality of channels;
    a first exhaust vent oriented to exhaust air from the first channel through an upper exterior surface of a vehicle; and
    a second exhaust vent oriented to exhaust air from the second channel through a lower exterior surface of the vehicle,
    wherein the ducting is further configured to distribute air received through the air intake to a condenser and a radiator, wherein the ducting distributes air entering the electric vehicle through the air intake evenly between the condenser and the radiator.

2. The vehicle cooling system as recited in claim 1, wherein the first heat exchanger is oriented substantially orthogonal with respect to the second heat exchanger.

3. The vehicle cooling system as recited in claim 2, wherein the first heat exchanger is a radiator configured to dissipate heat from a motor of the vehicle.

4. The vehicle cooling system as recited in claim 3, wherein the second heat exchanger is a condenser configured to dissipate heat from a cabin cooling system.

5. The vehicle cooling system as recited in claim 1, further comprising air movers configured to draw air into one or more of the plurality of channels.

6. The vehicle cooling system as recited in claim 1, wherein the first heat exchanger is a condenser configured to dissipate heat from a cabin cooling system.

7. The vehicle cooling system as recited in claim 6, wherein the second heat exchanger is a radiator configured to dissipate heat from a motor of the vehicle.

8. The vehicle cooling system as recited in claim 1, wherein the second exhaust vent includes a plurality of flow guides configured to bias air exiting the second exhaust vent towards a rear end of the vehicle.

9. A vehicle, comprising:
an engine;
an air conditioning system;
an air intake disposed along a forward facing surface of the vehicle;
ducting configured to distribute air received through the air intake into a plurality of channels;
a condenser in thermally conductive contact with the air conditioning system and positioned within a first channel of the plurality of channels; and
a radiator in thermally conductive contact with the engine and positioned within a second channel of the plurality of channels
temperature sensors configured to measure a temperature of the condenser and the radiator,
wherein the ducting is configured to vary an amount of air entering each of the channels based on the temperatures measured by the temperature sensors,
wherein a central portion of the ducting articulates in multiple directions to vary the amount of air entering each of the channels.

10. The vehicle as recited in claim 9, wherein air passing through the second channel is exhausted so that it exits the vehicle and passes over the hood of the vehicle.

11. The vehicle as recited in claim 9, wherein the first channel is separate and distinct from the second channel.

12. The vehicle as recited in claim 9, wherein the first channel includes an exhaust vent that is arranged so that the air exiting the first channel passes over the hood of the vehicle.

13. An electric vehicle, comprising:
an electric motor;
an evaporator;
a condenser configured to receive heat from the evaporator;
a radiator configured to receive heat from the electric motor, the radiator cooperating with the condenser to form a v-shaped structure;
an air intake; and
ducting configured to distribute air received through the air intake to the condenser and the radiator, wherein the ducting distributes air entering the electric vehicle through the air intake evenly between the condenser and the radiator.

14. The electric vehicle as recite din claim 13, wherein the condenser and the radiator each include cooling fins configured to increase the dissipation of heat from the condenser and the radiator.

15. The electric vehicle as recited in claim 13, further comprising:
flow guides positioned at an exhaust vent that direct the flow of air exiting the radiator along a lower surface of the electric vehicle.

\* \* \* \* \*